United States Patent [19]

Chen

[11] Patent Number: 5,332,134
[45] Date of Patent: Jul. 26, 1994

[54] BICYCLE LUGGAGE-CARRIER

[76] Inventor: Ming-Yung Chen, No. 7, Fu Kong Rd., Fu Hsin Industrial Area, Fu Hsin Hsiang, Chang Hua Hsien, Taiwan

[21] Appl. No.: 104,635

[22] Filed: Aug. 11, 1993

[51] Int. Cl.5 .............................. B62J 7/00; B62J 9/00
[52] U.S. Cl. ................................. 224/39; 224/42.45 R; 224/42.43; 224/32 A
[58] Field of Search ............... 224/32 R, 33 R, 52 A, 224/39, 40, 42, 42.45 R, 42.43; 248/231.6, 309.1; 211/17; 280/288.4

[56] References Cited

U.S. PATENT DOCUMENTS

| | | | |
|---|---|---|---|
| 2,439,623 | 4/1948 | Howells | 224/42.45 R |
| 3,937,374 | 2/1976 | Hine | 224/32 A |
| 4,154,382 | 5/1979 | Blackburn | 224/39 |
| 4,174,795 | 11/1979 | Jackson et al. | 224/32 A |
| 4,350,361 | 9/1982 | Fujii | 224/32 A X |
| 4,477,004 | 10/1984 | Barro | 224/39 |
| 5,257,727 | 11/1993 | Chen | 224/39 |

Primary Examiner—Glenn T. Barrett
Attorney, Agent, or Firm—Bacon & Thomas

[57] ABSTRACT

A bicycle luggage-carrier consisted of a carrier plate having an oblique front extension tube, a front mounting plate having one end fastened to the split front open end of the front extension tube and an opposite end fastened to the seat tube of the bicycle by a clamping plate, two curved seat stay connecting bars bilaterally connected between the front extension tube and the seat stays of the bicycle, and two substantially U-shaped brackets bilaterally hooked on two elongated slots on the carrier plate for carrying backpacks.

1 Claim, 3 Drawing Sheets

BICYCLE LUGGAGE-CARRIER

BACKGROUND OF THE INVENTION

The present invention relates to bicycle luggage-carriers, and more particularly to such a bicycle luggage-carrier having two brackets on two opposite sides thereof for carrying backpacks.

A variety of bicycles have been disclosed for different purposes, and have appeared on the market. While riding a bicycle for traveling, a lot of camping products may be carried on the luggage-carrier of the bicycle. In order to carry more things, backpacks may be hung on the luggage-carrier on two opposite sides. However, the backpacks may be oscillated and rubbed against the rear wheel of the bicycle as the bicycle is running over a rugged road surface. The present invention has been accomplished to provide a luggage-carrier having side brackets for carrying backpacks firmly.

SUMMARY OF THE INVENTION

According to one aspect of the present invention, the luggage-carrier is comprised of a carrier plate for carrying things, having a tall turned downward at right angles for mounting a reflector plate, and two elongated rods bilaterally disposed on two opposite sides thereof for hanging things, each elongated rod having a front end turned vertically upward then horizontally inward, and then connected to each other by a sleeve. Therefore, the sleeve can be used as a handlebar for the holding of the hands of the person being carried on the carrier plate, or served as a bumper to stop the load in place.

According to another aspect of the present invention, the carrier plate has an oblique front extension tube fastened to the bicycle's seat tube by a front mounting plate and a clamping plate, and also fastened to the bicycle's seat stays by two curved connecting bars. The front mounting plate has one end terminated to a rectangular connecting frame fitted into the split front open end of the front extension tube and fastened thereto either by a screw bolt or through a welding process, and an opposite end terminated to a toothed half round plate fastened around the bicycle's seat tube by the clamping plate. The clamping plate has one end fastened to one stop plate on one end of the tooth half round plate of the front mounting plate and an opposite end fastened to another stop plate on an opposite end of the toothed half round plate of the front mounting plate.

According to still another aspect of the present invention, two symmetrical half round lining plates are fastened around the seat tube and retained between the front mounting plate and the clamping plate to tighten up the connection. Each half round lining plate has a toothed outer surface engaged with the teeth on the inside surface of the clamping plate or the teeth on the toothed half round plate of the front mounting plate.

According to still another aspect of the present invention, two substantially U-shaped brackets are bilaterally hung on the carrier plate for carrying backpacks, each bracket having two curved opposite ends inserted into either elongated slot on the carrier plate and hooked on respective trapezoidal downward projections, which are made on the carrier plate through a punching process.

BRIEF DESCRIPTION OF THE DRAWINGS

The present invention will now be described by way of example, with reference to the annexed drawings, in which:

FIG. 2A is a partial enlarged view showing the tip of one bend of the bracket hooked on the respective downward trapezoidal projection of the carrier plate.

DETAILED DESCRIPTION OF THE PREFERRED EMBODIMENT

Figure 1:
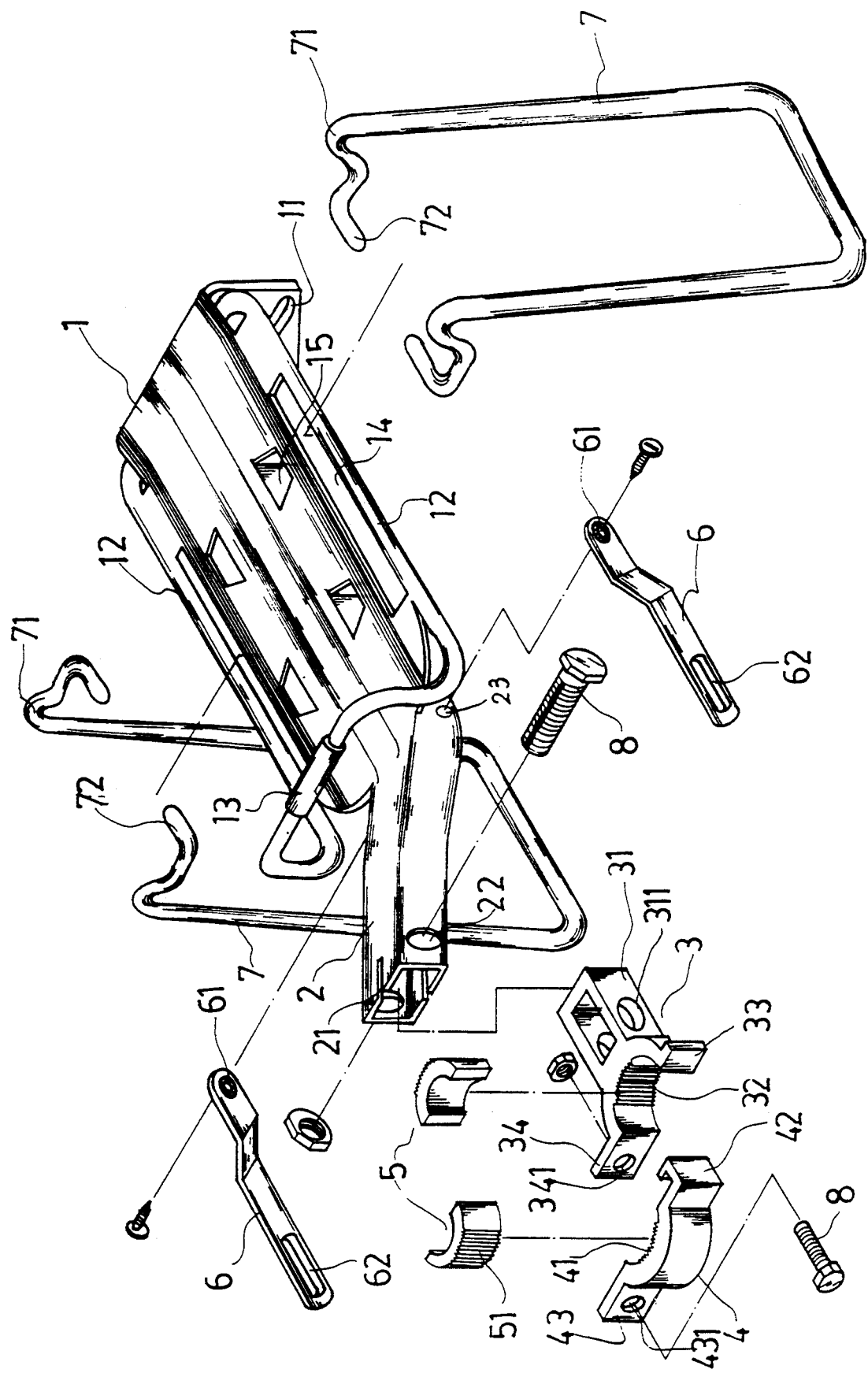
FIG. 1 is an exploded view of a bicycle luggage-carrier according to the preferred embodiment of the present invention.

Referring to FIG. 1, a luggage-carrier in accordance with the present invention is generally comprised of a metal carrier plate 1, a front mounting plate 3, a clamping plate 4, two half round lining plates 5, two seat stays connecting bars 6, and two brackets The carrier plate 1 is integrally made of metal in a substantially rectangular configuration, comprising a plurality of oblong through holes 11 on the tail thereof for mounting a reflector plate, two elongated rods 12 disposed on two opposite long sides thereof and respectively turned forward and upward then turned horizontally inward and then connected to each other by a sleeve 13, two elongated slots 14 bilaterally disposed between the two elongated rods 12, two pairs of downward trapezoidal projections 15 bilaterally disposed between the two elongated slots 14 and made by punching trapezoidal openings on the carrier plate 1, a front extension tube 2 disposed below the sleeve 13 and obliquely extended upward in the middle, wherein the front extension tube 2 is made in the shape of a hollow, rectangular tube, comprising two screw holes 23 bilaterally aligned near the rear end (foot) thereof, two mounting holes 22 bilaterally aligned near the front end thereof, and two splits 21 vertically aligned between the mounting holes 22 and longitudinally extended to the front end thereof in the middle. Further, the carrier plate has non-skid stripes on the top surface thereof for carrying things stably. The mounting plate 3 comprises a rectangular connecting frame 31, which fits into the front extension tube 2 and has two through holes 311 disposed on two opposite sides thereof in line with the mounting holes 22 on the front extension tube 2, and a toothed half round plate 32 having two opposite ends terminated to two opposite flat stop plates, namely, the left stop plate 34, which is relatively bigger and has a screw hole 341, and the right stop plate 33, which is relatively smaller. The clamping plate 4 comprises a toothed half round plate 41 symmetrical to the toothed half round plate 32, having one end terminated to a hook 42 releasably hooked on the right stop plate 33 of the front mounting plate 3, and an opposite end terminated to a flat stop plate 43 having a screw hole 431 correspondent to the screw hole 341 on the left stop plate 34. The half round lining plates 5 have each a toothed portion 51 on the outside in the middle. The seat stay connecting bars 6 are respectively made in a curved configuration for connecting the carrier plate 1 to the seat stays, each having a screw hole 61 on one end and an oblong hole 62 on an opposite end. The border of the screw hole 61 of each seat stay connecting bar 6 is embossed to increase friction resistance. The brackets 7 are respectively made in a substantially U-shaped configuration, each having two opposite ends formed into two curved bends 71 within 95x–100x angle and then respectively terminated to a respective tip 72 turned inwards toward each other.

Figure 2:
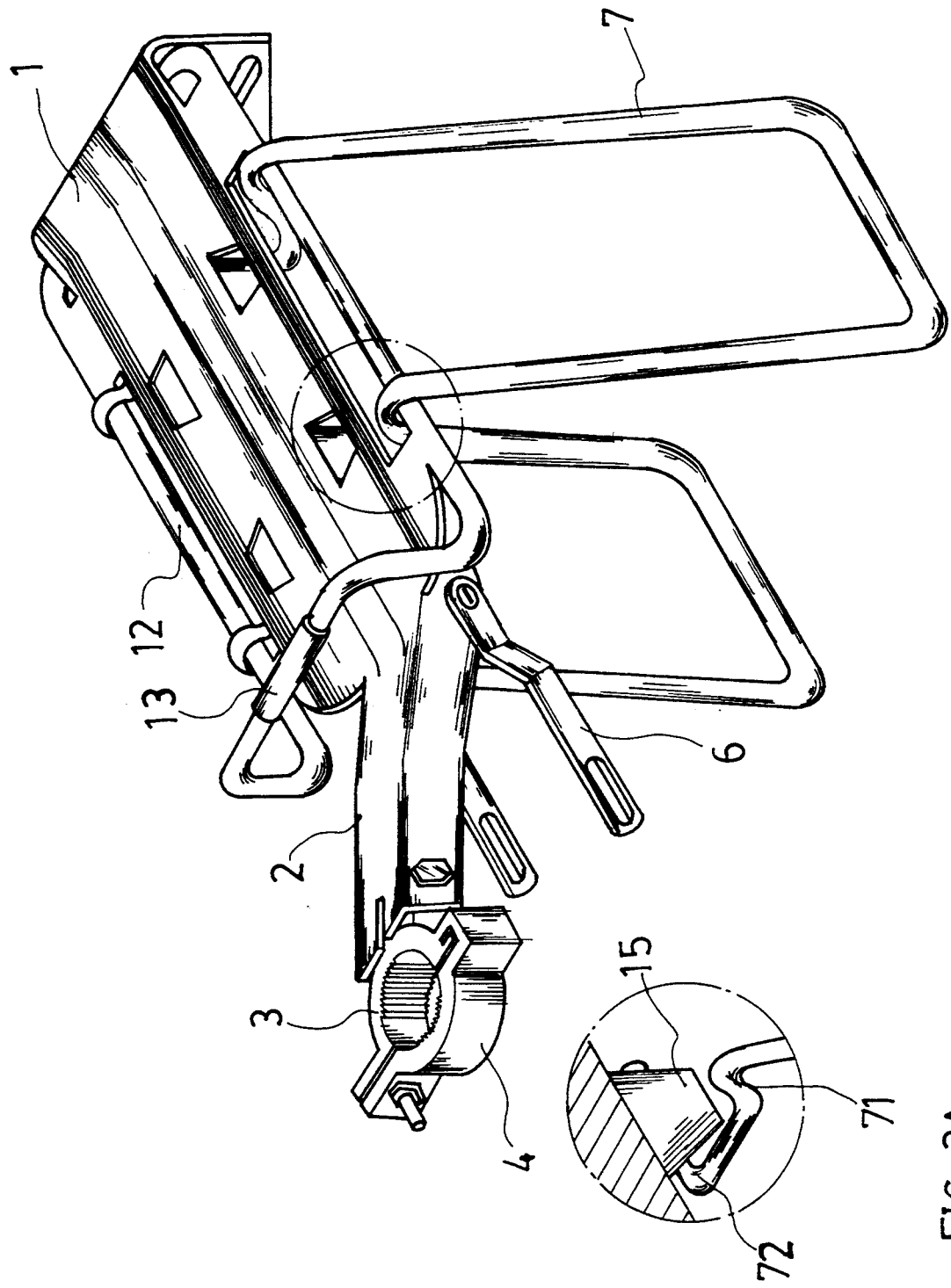
FIG. 2 is a perspective view of the bicycle luggage-carrier of the preferred embodiment of the present invention.
Figure 3:
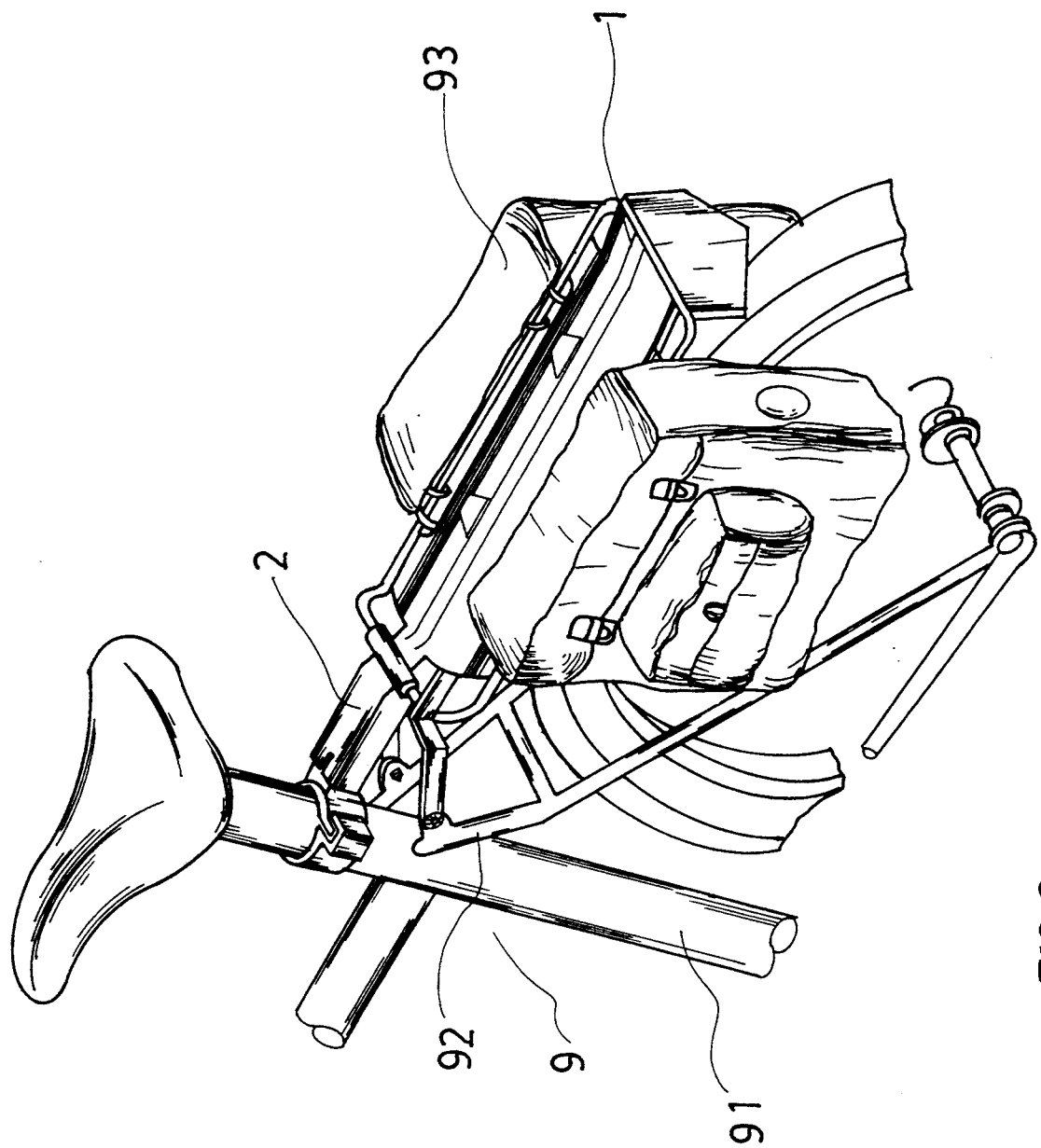
FIG. 3 is an installed view showing the luggage-carrier installed in a bicycle to carry backpacks.

Referring to FIGS. 2, 2A, and 3, and FIG. 1 again, the assembly process of the present invention is outlined hereinafter. The rectangular connecting frame 31 is inserted into the front extension tube 2, then a screw bolt 8 is inserted through the mounting holes 22 on the front extension tube 2 and the through holes 311 on the rectangular connecting frame 31 to fasten the front mounting plate 3 to the front extension tube 2 of the carrier plate 1. Alternatively, the rectangular connecting frame 31 of the front mounting plate 3 may be fastened to the front extension tube 2 of the carrier plate 1 through a welding process. The splits 21 on the front extension tube 2 allow the front end of the front extension tube 2 to be squeezed inward to firmly retain the rectangular connecting frame 31 of the front mounting plate 3 in the front extension tube 2 after its insertion into the front extension tube 2. Then, the toothed half round plate 32 of the front mounting plate 3 is fastened to the seat tube 91 of the bicycle 9 by the clamping plate 4 by hooking the hook 42 of the clamping plate 4 on the right stop plate 33 and threading a screw bolt 8 through the screw hole 431 on the flat stop plate 43 of the clamping plate 4 and the screw hole 341 on the left stop plate 34 of the toothed half round plate 32 of the front mounting plate 3. If the outer diameter of the seat tube 91 is much smaller than the hole defined between the toothed half round plates 32;41, the two half round lining plates 5 may be fastened around the seat tube 91 and retained between the toothed half round plates 32;42 for permitting the toothed portion 51 of each half round lining plate 5 to be engaged with the teeth on either toothed half round plate 32 or 42. As the inside surface of each half round lining plate 5 is smooth, it can be firmly clamped on the seat tube 91 by the clamping plate 4 and the front mounting plate 3. Then, the two seat stay connecting bars 6 are bilaterally connected between the front extension tube 2 of the carrier plate 1 and the seat stays 92 of the bicycle 9 by fastening the screw hole 61 on either seat stay connecting bar 6 to the screw hole 23 on either side of the front extension tube 2 and then fastening the oblong hole 62 to the seat stays 92 on either side. Therefore, the carrier plate 1 is fastened to the bicycle 9. Then, the two brackets 7 are respectively and bilaterally fastened to the carrier plate 1 by inserting the curved bends 71 into either elongated slot 14 from the top and then hooking the tips 72 on either pair of the downward trapezoidal projections 15 (see FIG. 2A).

When assembled and installed in the bicycle (see FIG. 3), the brackets 7 are spaced from the rear wheel of the bicycle at 5x–10x angle, and backpacks 93 can be hung on the two elongated rods 12 of the carrier plate 1 and fastened to the brackets 7 by tie ropes.

While only one embodiment of the present invention has been shown and described, it will be understood that various modifications and changes could be made without departing from the spirit and scope of the invention.

I claim:
1. A bicycle luggage-carrier comprising:
   a carrier plate adapted to be supported above a rear wheel of a bicycle for carrying objects, said carrier plate comprising non-skid stripes on a top surface thereof, a tail bent downward and having a plurality of oblong through holes adapted for mounting a reflector plate thereto, two elongated rods disposed on two opposite long sides thereof, said elongated rods having each a front end turned upward and then inward and then connected to each other by a sleeve, two elongated slots bilaterally disposed between said two elongated rods, two pairs of downward trapezoidal projections bilaterally disposed between said two elongated slots and made through a punching process, a front extension tube disposed below said sleeve and obliquely extended upward, said front extension tube comprising a front opening, two screw holes bilaterally aligned near a rear end thereof, two mounting holes bilaterally aligned near a front end thereof in communication with said front opening, and two splits vertically aligned between said mounting holes and longitudinally extended to the front end thereof;
   a mounting plate comprising a rectangular connecting frame fitted into said front opening of said front extension tube, said rectangular connecting frame having two through holes on two opposite sides thereof respectively aligned to said mounting holes on said extension tube, a toothed half round plate having two opposite ends respectively terminated to a left stop plate and a right stop plate, said right stop plate having a screw hole;
   a clamping plate fastened to the toothed half round plate adapted of said front mounting plate adapted to hold said front mounting plate to a seat tube of said bicycle, said clamping plate comprising a toothed half round plate adapted to be mounted around the seat tube of said bicycle, the toothed half round plate of said clamping plate having one end terminated to a hook hooked on the right stop plate of said front mounting plate and an opposite end terminated to a flat stop plate with a screw hole, the screw hole on the flat stop plate of said clamping plate being fastened to the screw hole on the left stop plate of said front mounting plate by a screw bolt;
   two half round lining plates adapted to be fastened around the seat tube of said bicycle and retained between the toothed half round plate of said clamping plate and the toothed half round plate of said front mounting plate, each half round lining plate having a toothed portion on an outer side engaged with the teeth on the toothed half round plate of said clamping plate or said front mounting plate;
   two seat stay connecting bars each having a screw hole on one end connected to the screw hole on either side of the rear end of said front extension tube of said carrier, and an oblong hole on an opposite end adapted to be connected to either side a pair of seat stays of said bicycle; and
   two brackets respectively made in a substantially U-shaped configuration and fastened to said carrier plate on either side for carrying backpacks, each bracket having two opposite ends formed into two curved bends and then respectively terminated to a respective tip turned inwards toward each other, the curved bends of each bracket being inserted into either elongated slot on said carrier plate from the top surface, the tip of either curved bend being hooked on an adjacent downward trapezoidal projection.

\* \* \* \* \*